United States Patent
Posselius

(10) Patent No.: US 7,448,316 B2
(45) Date of Patent: Nov. 11, 2008

(54) BALE WRAP OR TIE MONITOR

(75) Inventor: John H. Posselius, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 497 days.

(21) Appl. No.: 11/196,702

(22) Filed: Aug. 3, 2005

(65) Prior Publication Data

US 2007/0028579 A1 Feb. 8, 2007

(51) Int. Cl.
*B65B 57/10* (2006.01)
*G05D 15/00* (2006.01)

(52) U.S. Cl. .................................................. 100/4
(58) Field of Classification Search ............ 100/4, 100/5, 13, 102, 87, 99; 53/118, 67, 589, 53/64, 399, 116, 587, 504; 56/341
See application file for complete search history.

(56) References Cited

U.S. PATENT DOCUMENTS

| | | | |
|---|---|---|---|
| 4,624,179 A * | 11/1986 | Yves et al. ..................... | 100/4 |
| 4,674,403 A * | 6/1987 | Bryant et al. .................. | 100/4 |
| 4,850,271 A * | 7/1989 | White et al. ................... | 100/88 |
| 4,924,405 A * | 5/1990 | Strosser et al. ................ | 700/17 |
| 4,998,961 A | 3/1991 | Anderson et al. | |
| 5,103,106 A | 4/1992 | Golberstein | |
| 5,380,366 A | 1/1995 | Becker et al. | |
| 5,388,504 A * | 2/1995 | Kluver .......................... | 100/4 |
| 5,551,218 A * | 9/1996 | Henderson et al. ............ | 53/504 |
| 5,964,391 A | 10/1999 | Cain et al. | |
| 6,035,773 A | 3/2000 | Rempe | |
| 6,130,438 A | 10/2000 | Torai | |
| 6,370,852 B1 | 4/2002 | Ohlemeyer et al. | |
| 6,543,341 B2 | 4/2003 | Lopez | |
| 6,981,352 B2 * | 3/2006 | Chow et al. ................... | 56/64 |
| 2001/0018821 A1 * | 9/2001 | Chow .......................... | 53/589 |
| 2002/0029542 A1 * | 3/2002 | Davis et al. .................. | 53/399 |
| 2004/0016204 A1 * | 1/2004 | Chow et al. .................. | 53/67 |
| 2006/0048654 A1 * | 3/2006 | Biziorek ...................... | 100/87 |

* cited by examiner

*Primary Examiner*—Árpád Fábián-Kovács
(74) *Attorney, Agent, or Firm*—Patrick M. Sheldrake; John William Stader; Michael G. Harms

(57) ABSTRACT

These and other objects are achieved by providing a bale wrap or tie monitor that uses a sensor array to sense the presence or absence of twine, net or film after initial operation of the wrapping mechanism and prior to ejection of the bale onto the field. Either, or both, visual and audible alarms can be initiated when default conditions are met.

15 Claims, 3 Drawing Sheets

BALE WRAP OR TIE MONITOR

BACKGROUND OF THE INVENTION

The present invention relates to round balers and, more particularly, to a monitor for determining the success of a bale wrapping or tying process.

For many years, agricultural balers have been used to consolidate and package crop material so as to facilitate the storage and handling of the crop material for later use. Usually, a mower-condition cuts and conditions the crop material for windrow drying in the sun. When the cut crop material is properly dried, a baler, most likely a round baler, is pulled along the windrows to pick up the crop material and form it into cylindrically-shaped round bales. More specifically, the pickup of the baler gathers the cut and windrowed drop material from the ground then conveys the cut crop material with a conveyor, such as a rotating conveying rotor, into a bale-forming chamber within the baler. The pickup assembly has a drive mechanism that operates to power both the pickup and the conveying rotor, and the pickup drive mechanism is operably connected to and driven by the main drive mechanism of the baler. The baling chamber comprises a pair of opposing sidewalls with a series of belts that rotate and compress the crop material into a cylindrical shape. When the bale has achieved a desired size and density the operator wraps the bale to ensure that the bale maintains its shape and density. The operator raises the tailgate of the baler and ejects the bale onto the ground. The tailgate is then closed and the cycle repeated as necessary and desired to manage the field of cut crop material.

Common practice has the baler wrap the bales with twine, net-like or continuous plastic sheeting. With twine, the bale is wrapped back and forth from side-to-side as the bale is turned, from a single dispensing mechanism, or back and forth from middle-to-side from as the bale is turned, from dual dispensing mechanisms with twine numerous time, the twine "gripping" the crop material and prior wrappings of twine adequately to hold the package together in a process often referred to as "tying". Net wrap is made of a plastic sheet, generally equal in width to the bale being formed, with regular openings therethrough and is overlapped on itself to hold he package together. An adhesive may be used to improve the holding power of the net wrap. Plastic wrap, or film, is a generally continuous sheet of plastic, also generally the width of the bale being formed, with a somewhat adhesive surface that grips itself when overlapped and the crop material to form the package.

Once the bale is formed and tied or wrapped, it is ejected through the rear of the baler onto the field where it may sit until use, or may be collected into a central location for longer term storage. The tying and wrapping processes are subject to a number of failures or defaults. More particularly, the baler obviously carry limited supplies of packaging materials, so on occasion, the supplies run out and could result in the ejection of a bale that has been neither tied nor wrapped. Also, rips or tears do occur in the net wrap and plastic wrap materials, resulting in only partially coverage of the bale before ejection. Round bales are created under considerable pressure, so a tear or rip in wrapping material is magnified with undesirable consequences in bale shape and rigidity.

Practically, it is the operator's responsibility to look over his shoulder and try to monitor the progress of bale formation, its tying or wrapping, and its ejection—all while driving the tractor. Not only is this a difficult responsibility to meet, it is impossible in some cases because many balers have components on the front thereof blocking a reasonable view of the bale.

It would be a great advantage to provide a wrap or tie monitor that overcomes the above problems and disadvantages.

SUMMARY OF THE INVENTION

Accordingly, it is an object of the present invention to provide an improved bale wrap or tie monitor that avoids the above-noted disadvantages.

It is another object of the present invention to provide a bale wrap or tie monitor that uses the visual, near visual, or near infrared spectral reflectance of a round bale to verify that the net or film or twine has wrapped the bale prior to ejection of the bale from the bale chamber of a round baler.

It is a further object of the present invention to provide a bale wrap or tie monitor that uses a sensor array to detect the presence or absence of twine or wrap materials on a round bale.

It is a further object of the present invention to provide a round bale wrap or tie monitor that sends signals to the baler control unit where logic circuitry determines the presence or absence of "packaging" material on the bale prior to ejection from the baler.

It is a still further object of the present invention to provide a wrap or tie monitor that sends signals to the logic circuitry of a control unit or processor, the circuitry being adaptive in that no specific spectrum or wavelength need be identified.

It is a yet further objected of the present invention to provide a diode sensor array adjacent the surface of a round bale to obtain a baseline reading of the reflectance of the crop being baled. Signals from the array are fed to logic circuitry that is adaptive in that no specific spectrum or wavelength would have to be identified. The logic looks only for a change in the magnitude of the sensor array output from the baseline obtained while baling compared to the readings at the time the wrapping mechanism has been initiated. Either a visual or audible alarm is initiated when default conditions are met.

These and other objects are achieved by providing a bale wrap or tie monitor that uses a sensor array to sense the presence or absence of twine, net or film after initial operation of the wrapping mechanism and prior to ejection of the bale onto the field. Either, or both, visual and audible alarms can be initiated when default conditions are met and/or the bale ejection process can be locked or blocked.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Round balers are well known in the agricultural industry, and the instant invention can be used with substantially any of such machines. Reference is made, for example, to U.S. Pat. Nos. 6,688,092; 6,295,797 and 6,170,246 that illustrate and reference such balers.

Figure 1:
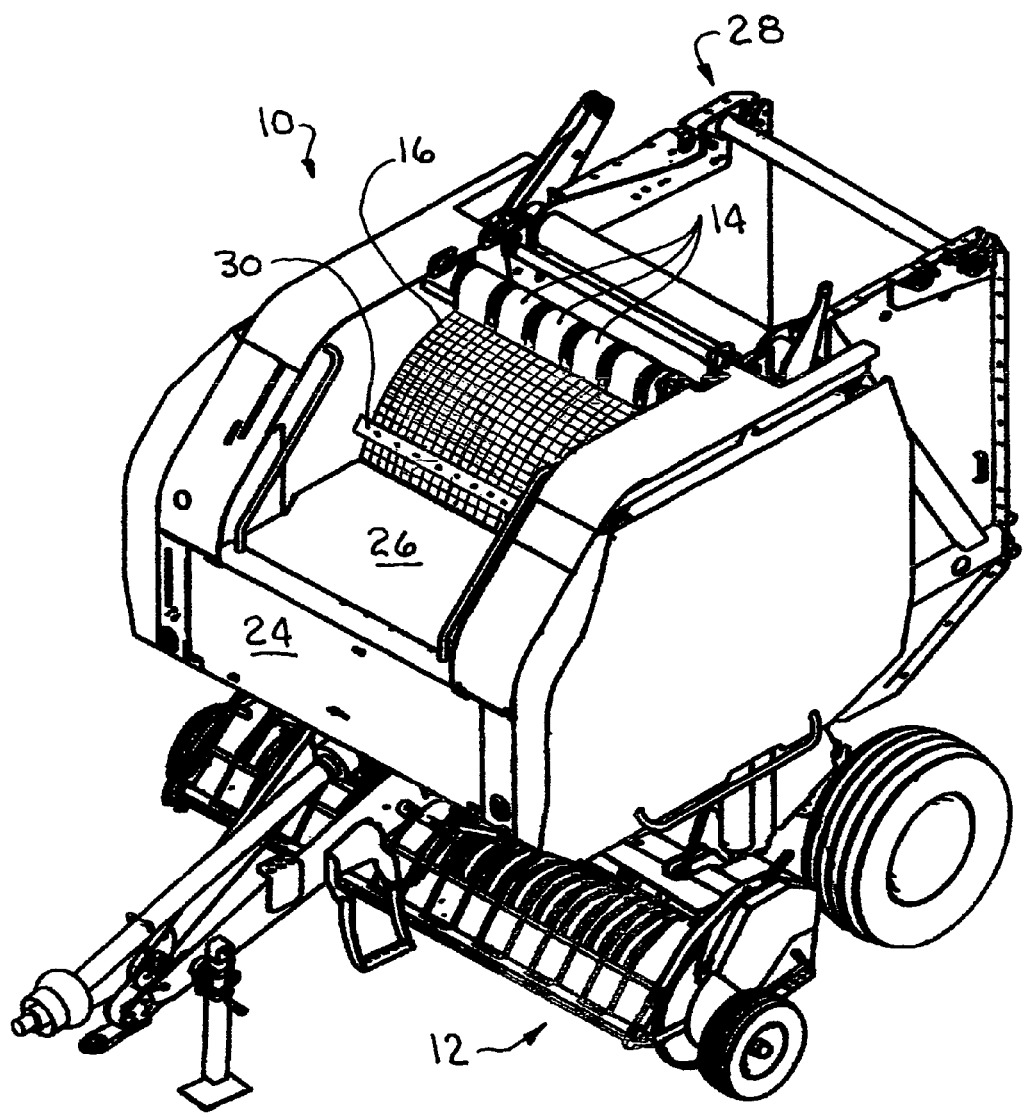
FIG. 1 is a partially perspective view of a round baler of the type with which the instant invention is to be used, also showing one of the possible locations of the sensor array.

FIG. 1 depicts an agricultural round baler, generally designated 10, as it would be pulled from right to left along a windrow of cut crop material by a tractor (not shown). Baler 10 is comprised of a wheel-supported bale-forming mechanism with a crop pickup 12 for moving the crop material from the field along and into a stuffer assembly (not shown). The stuffer assembly pushes the crop material into the bale chamber, i.e., the three-dimensional area between the side walls and the changing volume generally within the bale-forming belts (some marked with reference numeral 14), the floor roll and the starter roll (neither shown). Formed bale 16 is shown to be covered by net wrap 20 (see FIG. 2) that has been applied to the bale by dispenser 22, hidden behind panels 24 and 26 in FIG. 1. The rear of baler 10 is generally closed at the rearward end thereof by a framed tailgate 28, pivotably attached at the top thereof for pivoted opening and closing either automatically by a control system or by manual triggering by the operator. In the open position, the tailgate triggers the ejection of the bale onto the ground.

In this description there will be discussion of diodes formed in a sensor array. These diodes can be of many kinds and makes, so long as it is understood that the preferred embodiment employs light-emitting diodes to emit light waves of a certain wavelength, as discussed in more detail below, and then detect the reflection of those light waves. Included in, but not limited to, satisfactory sensors are single transmitting and receiving light emitting diodes (LEDs). The concept relies upon the fact that different surfaces, or materials, have different reflectance values and thus present different values when detected. More simply, each LED emits light at a wavelength, say, for example, 360 nm, and directs it to the bale surface. If the bale is made up of dry corn stalks, it will have a reflectance value, for example, 4, and this value will be determined by the photo-sensitive element in the diode when the light is detected. It should be appreciated that one could use a different source of light, other than the diode, and arrange the two such that the reflected light is detected by the diode; however, such an arrangement would be more complicated, less reliable, and more costly than the single diode of this preferred embodiment. Furthermore, the wavelength of the light emitted can be within a quite extensive range; visual, near visible, and near infrared.

Figure 3:
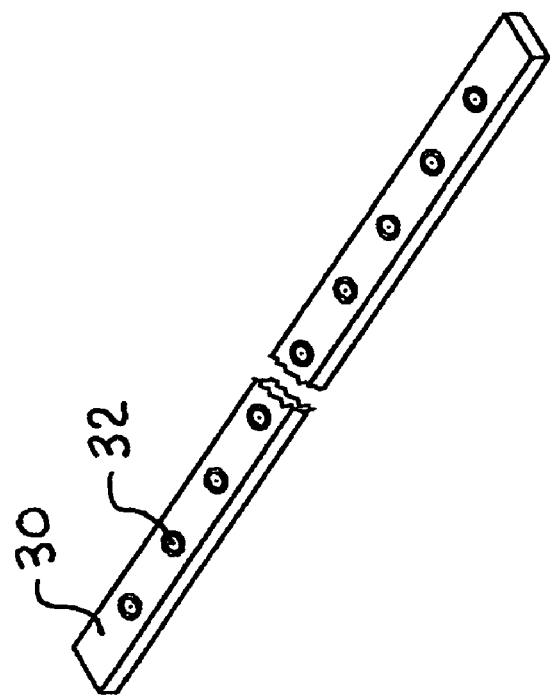
FIG. 3 is a partial perspective view of the sensor array.
Figure 2:
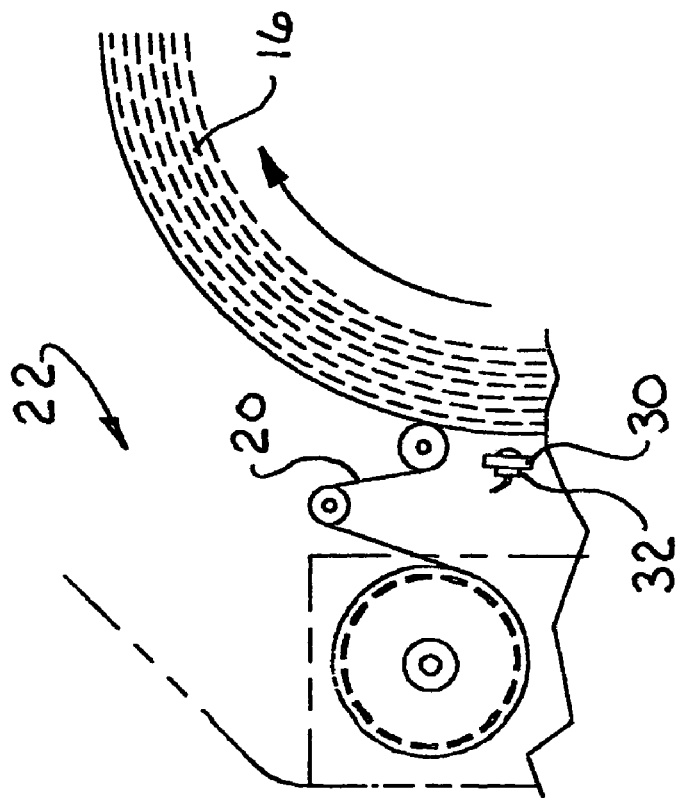
FIG. 2 is a partial depiction of a baler, showing more clearly the relationship between the sensor array and the formed bale.

Referring again to FIGS. 1-3, an elongate bar 30 is shown affixed to baler 10 to extend across the width of the formed bale a spaced slightly away therefrom. The actual distance will vary depending upon certain factors such as wavelength used, diode power, and the like. In general, a distance of approximately one half an inch to about four inches has been found quite satisfactory under most conditions. The diodes 32 are mounted through holes in bar 30 in any reasonable manner, such as, for example, with adhesive or through a pod. The distance between adjacent diodes will also depend upon various factors, such as access to the bale surface (belts may partially limit access to the surface), the width dimension of the bale, and whether it is wrap or a tie that is being detected (tying may require more diodes for reasons to be discussed further below). The location of the sensor bar 30 can be varied with the structure and operation of the baler. FIG. 1 shows one possible location to be above the dispenser, while FIG. 2 shows an alternative position below.

Figure 4:
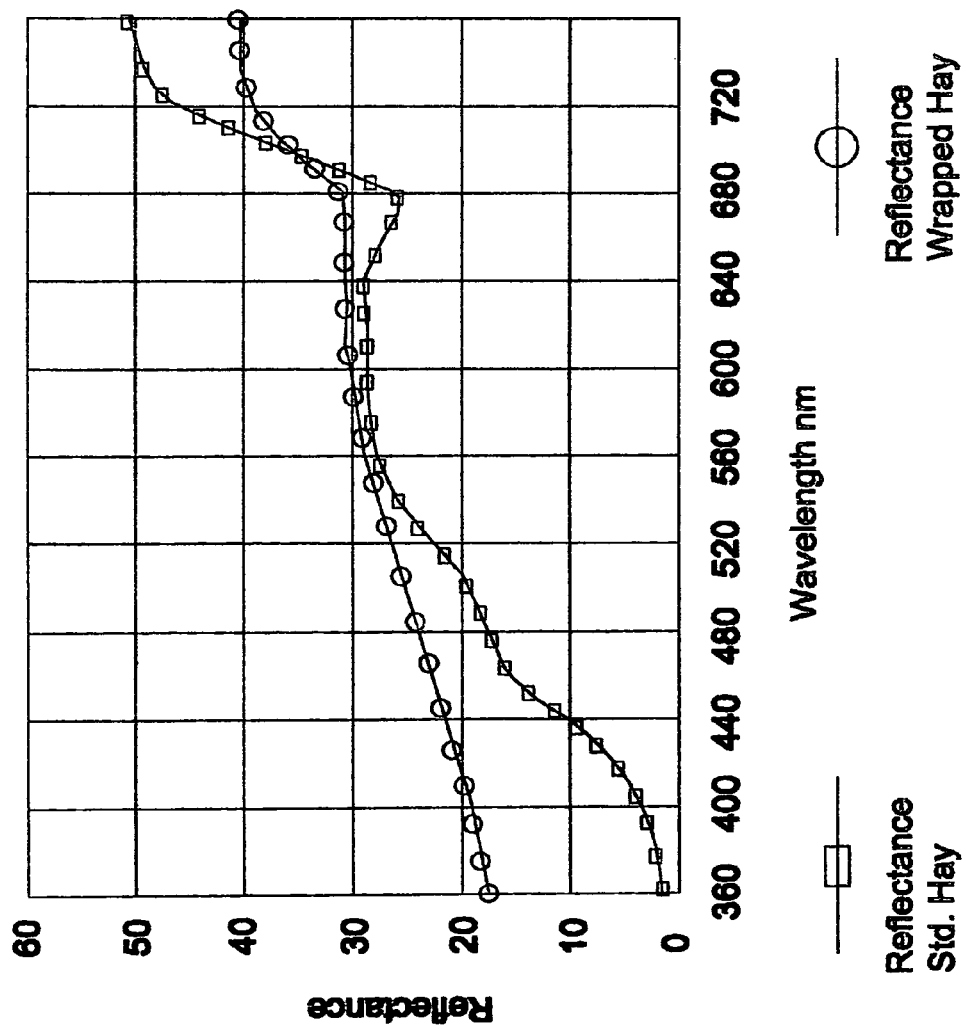
FIG. 4 is an exemplary comparison graph of the sensor signal of a baseline reflectance and one with net wrap in place, showing the locations of maximum difference.

The preferred operational procedure is to activate the array prior to wrapping the bale to obtain an initial or baseline reading. Then, the bale wrapping mechanism is activated, and, when the process should be completed, i.e., the wrap or tie should have been completed, the array activated again. The logic circuitry would compare the two readings and, in its simplest form, make a basic yes/no decision on whether the bale has been wrapped. If the decision is "yes" nothing happens and the bale can be ejected; however, if the decision is "no" the operator would be notified by a visual or audible alarm. Further, the alarm signal could be used to prevent bale ejection. The graph of FIG. 4 shows exemplar baseline ("Standard Hay") and wrapped bales ("Wrapped Hay") reflectance readings relative to different wavelengths of light. It would be best to make the decision point one of the locations where the difference between the baseline reflectance is at greatest variance with the "wrapped" hay—in this example, at 360 nm or at 760. In the alternative, these points could be predetermined in accordance with the crop being baled, and programmed into the logic circuitry. In either case, it should be appreciated that fewer errors will result when the determination is made when the largest possible variance is used as the decision point. In an additional alternative, the sensor array could read continually, capturing an average reading prior to the wrapping cycle, and then a second average reading could be taken after the wrapping cycle has occurred, or should have occurred, and finally the comparison made.

For net wrap and plastic wrap, the sensor array should be directed substantially radially onto the surface of the bale. Tying bales with twine presents a somewhat different situation in that the twine does not cover as much of the bale surface, and thus its reflectance cannot be read as easily. While this will work satisfactorily, particularly if the number of diodes in the array is increased, it is a possible source of error not presented in the other circumstances. The effectiveness of the array at detecting twine is increased by placing the array at a very slight angle, less than one or two degrees, to the bale surface. This increases the surface area hit by the light and increases the opportunity to detect twine. Also, when using twine, it is obviously best to use plastic with this system as natural twines do not ordinarily come in colors compatible with making a very clear determination of reflectance differences.

Figure 5:
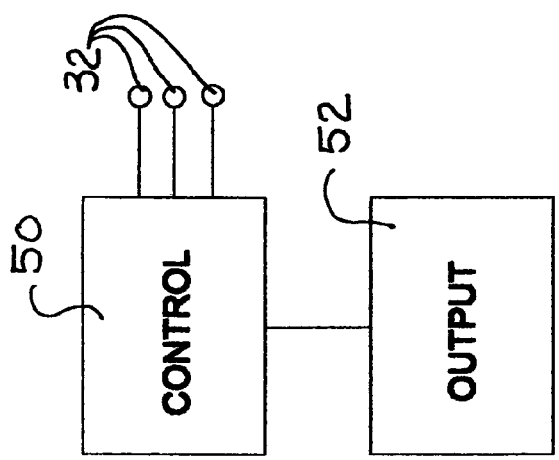
FIG. 5 is a depiction of the control module-sensor array of the instant invention.

FIG. 5 is a depiction of a useful combination of components to determine whether or not the bale has been tied or wrapped, and provide an output when a failure is detected. Specifically, the diodes 32 generate a signal dependent upon the reflectance of the bale surface, as discussed above, and those signals are combined or individually transferred to control unit 50. Control unit 50 could be the control unit for the baler or it could be a separate component, though combining the two would make more sense from a cost and efficiency point of view. The importance of the control unit is that it contains the logic circuitry that makes decisions, like the yes/no decision discussed above, and generates the appropriate output signal. That output signal is directed to output device 52 which could be an audible alarm, a visual warning or both. Additionally, the output signal could be directed to the control circuitry of the baler, preventing the ejection of the formed bale or performing some other activity that forces a thoughtful decision from the operator before the bale can be ejected.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown. For example, it is within the scope of this invention that while using a Near Infrared (NIR) sensor or a sensor array working in the visual spectrum that has been tuned for various specific features such as moisture, protein or fiber measurements during the baling process could also acknowledge the wrap/no wrap status of the bale based on the magnitude of change or lack of change the sensor reads when the wrapping cycle has been initiated.

Having thus described the invention, what is claimed is:

1. In a round baler having a wheel-supported main frame having a front end and an opposing rear end and adapted for movement in a direction of travel through a field of cut crop material, a bale-forming chamber supported on said main frame and including a plurality of belts and rollers arranged to form a cylindrical bale within the bale-forming chamber, a pickup mounted to the forward end of said main frame and adapted to pick up crop material from the field and feed it into the bale-forming chamber, a tailgate pivotably affixed to the bale-forming chamber and adapted to pivot vertically between a closed position where a bale is captured in the bale-forming chamber and an open position where the bale can be ejected, and a twine or wrapping material dispensing mechanism affixed to the main frame and located to partially enclose the crop material in the bale-forming chamber, the improvement comprising:

an array of sensors supported on said baler and located in a position to sense the reflectance of the cylindrical surface of the formed bale in the bale-forming chamber;

logic circuitry associated with the array of sensors and configured for receiving signals therefrom relative to the reflectance of the surface of the bale formed in the bale-forming chamber, associating the reflectance value with an amount of twine or wrapping material applied by the dispensing mechanism to the bale and generating results based upon the logic steps taken by the logic circuitry; and an output device connected to said logic circuitry for receiving the results from the logic circuitry and communicating audibly or visually.

2. The improvement of claim 1, wherein:
the dispensing mechanism dispenses a net wrap or a film; and the sensors are LEDs.

3. The improvement of claim 2, wherein;
the signal from the array of sensors corresponds to the reflectance of the surface of the bale formed in the bale-forming chamber; and
the logic circuitry is capable of storing, manipulating and comparing multiple signals from the array of sensors.

4. The improvement of claim 3, wherein:
the sensors are directed radially onto the cylindrical surface of the bale being formed.

5. The round baler of claim 1, wherein:
the logic circuit is configured to receive an initial reading of reflectance from the sensor before activation of the dispensing mechanism and a second reading after the dispensing mechanism is initiated; and
the logic circuit is configured to compare the second reading with the first reading and associate an amount of wrap applied to the bale with the difference between the first and second reading and generate a default signal if the difference between the two readings is greater than a predetermined amount.

6. In a round baler having a wheel-supported main frame having a front end, and an opposing rear end and adapted for movement in a direction of travel through a field of cut crop material, a bale-forming chamber supported on said main frame and including a plurality of belts and rollers arranged to form a cylindrical bale within the bale-forming chamber, a pickup mounted to the forward end of said main frame and adapted to pick up crop material from the field and feed it into the bale-forming chamber, a tailgate pivotably affixed to the bale-forming chamber and adapted to pivot vertically between a closed position where the bale is captured in the bale-forming chamber and an open position where the bale can be ejected, a twine or wrapping material dispensing mechanism affixed to the main frame and located to partially enclose the crop material in the bale-forming chamber, and an electronic control unit receiving and sending signals for the operation of the baler, the improvement comprising:

an array of sensors supported on said baler and located in a position to sense the reflectance of the cylindrical surface of the formed bale in the bale-forming chamber;

logic circuitry associated with the array of sensors and configured for receiving signals therefrom relative to the reflectance of the surface of a bale formed in the bale-forming chamber, associating the reflectance value with an amount of twine or wrapping material applied by the dispensing mechanism to the bale and generating results based upon the logic steps taken by the logic circuitry; and an output device connected to said logic circuitry and the electronic control unit of the baler for receiving the results from the logic circuitry and communicating audibly or visually and by sending signals to the electronic control unit of the baler to permit or deny ejection of the bale from the bale-forming chamber.

7. The improvement of claim 6, wherein:
the dispensing mechanism dispenses net wrap or film; and the sensors are LEDS.

8. The improvement of claim 7, wherein:
the signal from the array of sensors corresponds to the reflectance of the surface of a bale formed in the bale-forming chamber; and
the logic circuitry is capable of storing, manipulating and comparing multiple signals from the array of sensors.

9. The improvement of claim 8, wherein:
the sensors are directed radially onto the cylindrical surface of the bale being formed.

10. A method of determining if the cylindrical surface of a rotating round bale has been tied or wrapped, comprising the steps of:
   providing a cylindrically-shaped round bale;
   rotating the bale about its cylindrical axis;
   providing a mechanism to dispense twine or wrapping material and place it on the cylindrical surface of the round bale;
   providing an array of LEDs positioned to sense the reflectance of the cylindrical surface of the bale and generate an electrical signal corresponding to that sensed reflectance;
   providing logic circuitry to receive and compare the electrical signal from the array with values stored in the circuitry, and generate an output signal corresponding to that comparison;
   taking a first reading from the array to generate a first electrical signal corresponding to the reflectance on the cylindrical surface of the bale;
   storing that first signal in the logic circuitry;
   activating the mechanism to dispense twine or wrapping material and place it on the cylindrical surface of the round bale;
   taking a second reading from the array to generate a second electrical signal corresponding to the reflectance of the surface of the bale;
   comparing, within the logic circuitry, the second reading with the first reading and generating a default signal if the difference between the two readings is greater than a predetermined amount configured to a reflectance difference of a sufficiently wrapped or tied bale.

11. The method of claim 10, further including the step of:
   directing the LEDs radially at the cylindrical surface of the round bale.

12. The method of claim 11, wherein:
   the logic circuitry controls the rotation of the round bale.

13. A method of determining if the cylindrical surface of a rotating round bale has been tied or wrapped, comprising the steps of:
   providing a cylindrically-shaped round bale;
   rotating the bale about its cylindrical axis;
   providing a mechanism to dispense twine or wrapping material and place it on the cylindrical surface of the round bale;
   providing an array of LEDs positioned to sense the reflectance of the cylindrical surface of the bale and generate an electrical signal corresponding to that sensed reflectance;
   providing logic circuitry to receive and compare the electrical signal from the array with values stored in the circuitry) and generate an output signal corresponding to that comparison;
   activating the mechanism to dispense twine or wrapping material and place it on the cylindrical surface of the round bale;
   taking a reading from the array to generate an electrical signal corresponding to the reflectance of the surface of the bale;
   comparing, within the logic circuitry, the reading with a predetermined value stored in the logic circuitry and generating a default signal if the difference between the reading and the stored value is greater than a predetermined amount configured to a reflectance reading of a sufficiently wrapped or tied bale.

14. The method of claim 13, further including the step of directing the LEDs radially at the cylindrical surface of the round bale.

15. The method of claim 14, wherein:
the logic circuitry controls the rotation of the round bale.

* * * * *